US012599990B2

(12) United States Patent
Yufit et al.

(10) Patent No.: US 12,599,990 B2
(45) Date of Patent: Apr. 14, 2026

(54) LIQUID COLD WELDING METHODS AND APPARATUS

(71) Applicant: Addionics IL Ltd, Tel-Aviv Yaffo (IL)

(72) Inventors: Vladimir Yufit, London (GB); Le Sheng Nicholas Yiu, London (GB); Belen Bello Rodriguez, London (GB); Farid Tariq, London (GB); Moshiel Biton, Tel-Aviv Yaffo (IL); Nir Halup, Tel-Aviv Yaffo (IL)

(73) Assignee: Addionics IL Ltd, Tel-Aviv Yaffo (IL)

( * ) Notice: Subject to any disclaimer, the term of this patent is extended or adjusted under 35 U.S.C. 154(b) by 530 days.

(21) Appl. No.: 18/027,949

(22) PCT Filed: Sep. 19, 2021

(86) PCT No.: PCT/IL2021/051135
§ 371 (c)(1),
(2) Date: Mar. 23, 2023

(87) PCT Pub. No.: WO2022/064483
PCT Pub. Date: Mar. 31, 2022

(65) Prior Publication Data
US 2023/0330783 A1 Oct. 19, 2023

(30) Foreign Application Priority Data

Sep. 24, 2020 (IL) .......................................... 277589

(51) Int. Cl.
*B23K 28/00* (2006.01)
*C25D 5/02* (2006.01)
(Continued)

(52) U.S. Cl.
CPC ............. *B23K 28/006* (2013.01); *C25D 5/02* (2013.01); *C25D 5/022* (2013.01); *C25D 5/34* (2013.01);
(Continued)

(58) Field of Classification Search
CPC .......... C25D 5/02; C25D 5/022; C25D 17/04; C25D 5/34
See application file for complete search history.

(56) References Cited

U.S. PATENT DOCUMENTS 2,409,295 A * 10/1946 Marvin ............... C23C 18/1644
205/228
5,300,165 A 4/1994 Sugikawa
(Continued)

FOREIGN PATENT DOCUMENTS

CN 101036954 A 9/2007
CN 101705501 A 5/2010
(Continued)

OTHER PUBLICATIONS

International Preliminary Report on Patentability Dated Apr. 6, 2023 From the International Bureau of WIPO Re. Application No. PCT/IL2021/051135. (7 Pages).
(Continued)

*Primary Examiner* — Brian W Cohen
(74) *Attorney, Agent, or Firm* — The Roy Gross Law Firm, LLC; Roy D. Gross

(57) ABSTRACT

The application discloses a method of liquid cold welding (LCW) including: (a) engaging two or more porous conductive substrate layers between perforated non-conductive frames so that the substrate layers contact one another; (b) immersing the substrate layers in an electrolyte solution; and (c) applying electric current and/or voltage and/or electric power to the electrolyte solution. Apparatus suitable for performance of some embodiments of the method are also disclosed.

7 Claims, 20 Drawing Sheets

(51) Int. Cl.
C25D 5/34 (2006.01)
C25D 7/06 (2006.01)
C25D 17/04 (2006.01)
C25D 17/06 (2006.01)

(52) U.S. Cl.
CPC ............... C25D 7/06 (2013.01); C25D 17/04 (2013.01); C25D 17/06 (2013.01)

(56) References Cited

U.S. PATENT DOCUMENTS

| | | | |
|---|---|---|---|
| 8,715,871 B2 | 5/2014 | Callahan et al. | |
| 9,244,101 B2 | 1/2016 | Cohen et al. | |
| 2005/0017055 A1 | 1/2005 | Kurz et al. | |
| 2009/0239353 A1 | 9/2009 | Zhang | |
| 2010/0147695 A1 | 6/2010 | Cohen | |
| 2013/0029481 A1 | 1/2013 | Fitzpatrick et al. | |
| 2021/0269930 A1* | 9/2021 | Swonger ............. | H01M 4/0404 |

FOREIGN PATENT DOCUMENTS

| | | |
|---|---|---|
| CN | 102699510 A | 10/2012 |
| CN | 106862685 A | 6/2017 |
| CN | 108031998 A | 5/2018 |
| JP | H08283984 A | 10/1996 |
| RU | 2014979 C1 | 6/1994 |
| WO | WO 2022/064483 | 3/2022 |

OTHER PUBLICATIONS

International Search Report and the Written Opinion Dated Dec. 19, 2021 From the International Searching Authority Re. Application No. PCT/IL2021/051135. (7 Pages).

Office Action Dated Jan. 29, 2023 From the Israel Patent Office Re. Application No. 277589. (3 Pages).

Du et al. "Welding by Metal-Electrolyte Discharge", Materials and Manufacturing Process, 25(7): 644-647, Published Online Aug. 5, 2010.

Jackman et al., (1998) Fabrication of three-dimensional microstructures by electrochemically welding structures formed by microcontact printing on planar and curved substrates. Journal of microelectromechanical systems 7(2): 261-266. doi: 10.1109/84.679396.

\* cited by examiner

LIQUID COLD WELDING METHODS AND APPARATUS

RELATED APPLICATIONS

This application is a National Phase of PCT Patent Application No. PCT/IL2021/051135 having International filing date of Sep. 19, 2021, which claims the benefit of priority of Israeli Patent Application No. 277589, filed on Sep. 24, 2020. The contents of the above applications are all incorporated by reference as if fully set forth herein in their entirety.

FIELD OF THE INVENTION

The invention is in the field of metals manufacturing.

BACKGROUND OF THE INVENTION

Porous 3D metal objects can be fabricated from stack of 2D meshes and/or porous films. These substrates are stacked up under pressure and placed in the furnace at high temperature under vacuum or inert gas environment. High temperature increases thermal energy of the metal atoms that diffuse across the substrates. This results in formation of 3D metal objects of various porosity and various pore shapes and sizes. The porosity can be open or closed. Few examples of this approach to fabricate electrochemical reactors with porous metal structures are disclosed by previous art in U.S. Pat. No. 8,715,871B2 and US20050017055A1. One of the major drawbacks of this approach is a need of high temperature for actual layer bonding to take place.

High resolution porous 3D metal structures can also be formed using a combination of photoresist patterning and electrodeposition. In order to achieve a desired thickness and porosity multiple repetitive steps involving patterning, electroplating, pattern dissolution and partial metal dissolving. Some examples of this fabrication routine are described in US20090239353A1, US20100147695A1, US20130029481A1 and US00924410162. Though these steps are frequently employed by microfabrication industry, it is quite difficult to make them cost effective and scalable for substrates that are larger than typical silicon wafers.

SUMMARY OF THE INVENTION

One aspect of some embodiments of the invention relates to use of liquid cold welding (LCW) or welding to produce porous 3D metal structures. For purposes of this specification and the accompanying claims, the term "Liquid Cold Welding" or "LCW" indicates joining two or more metal or metal composite substrates immersed into liquid electrolyte solution by means of metal or metal composite deposited from the electrolyte solution during localized electrochemical reaction. According to various exemplary embodiments of the invention LCW is cost-effective and/or scalable.

It will be appreciated that the various aspects described above relate to solution of technical problems associated with scalability of production of porous 3D metal structures Alternatively or additionally, it will be appreciated that the various aspects described above relate to solution of technical problems related to control of properties during production.

In some exemplary embodiments of the invention there is provided a method of liquid cold welding (LCW) including: (a) engaging two or more porous conductive substrate layers between perforated non-conductive frames so that the substrate layers contact one another; (b) immersing the substrate layers in an electrolyte solution; and (c) applying electric current and/or voltage and/or electric power to the electrolyte solution. In some embodiments the applying includes applying an electric current flowing from working electrode (WE), through the porous metal substrate layers between perforated non-conductive frames to a counter electrode (CE). Alternatively or additionally, in some embodiments the applying includes applying a constant voltage. Alternatively or additionally, applying includes applying a constant voltage using a reference electrode (RE). Alternatively or additionally, in some embodiments the applying includes applying a constant power. Alternatively or additionally, in some embodiments the method includes folding a single porous conductive substrate layer to form two or more porous conductive substrate layers. In some embodiments the method includes: feeding two or more porous conductive substrate layers concurrently between the perforated non-conductive frames; and withdrawing the two or more porous conductive substrate layers after LCW as a bonded substrate. Alternatively or additionally, in some embodiments the method includes increasing a distance between the perforated non-conductive frames to facilitate insertion and/or removal of the two or more porous conductive substrate layers. Alternatively or additionally, in some embodiments the method includes decreasing a distance between the perforated non-conductive frames so that the substrate layers contact one another. Alternatively or additionally, in some embodiments the method includes pumping the electrolyte solution through said perforated non-conductive frames and said substrate layers during said applying.

In some exemplary embodiments of the invention there is provided a liquid cold welding (LCW) apparatus including: a container with two counter electrodes positioned opposite one another within the container; and at least two perforated non-conductive frames adapted to engage and retain a multilayer substrate so the layers remain in contact with one another; the frames positioned between the counter electrodes. In some embodiments, the contact is mechanical contact.

In some exemplary embodiments of the invention there is provided an liquid cold welding (LCW) including: a container with an active electrode and a reference electrode positioned opposite one another within the container; and at least two perforated non-conductive frames adapted to engage and retain a multilayer substrate so the layers remain in contact with one another; the frames positioned between the active electrode and reference electrode.

With regard to either or both of the above apparatus:

In some embodiments the apparatus includes two or more feed rollers adapted to feed two or more porous conductive substrate layers concurrently between the perforated non-conductive frames; and an uptake roller adapted to spool the two or more porous conductive substrate layers after LCW as a bonded substrate. Alternatively or additionally, in some embodiments the apparatus includes a distance regulation mechanism adapted to adjust a distance between the perforated non-conductive frames. In some embodiments the distance regulation mechanism increases distance to facilitate insertion and/or removal of the two or more porous conductive substrate layers. Alternatively or additionally, in some embodiments the distance regulation mechanism decreases a distance between the perforated non-conductive frames so that the substrate layers contact one another during welding. Alternatively or additionally, in some embodiments the apparatus includes a folding mechanism configured to fold a single porous conductive substrate layer to produce a stack of porous conductive substrate layers. Alternatively or additionally, in some embodiments the apparatus includes a pump positioned to pump the electrolyte solution through the perforated non-conductive frames and the substrate layers during operation.

Unless otherwise defined, all technical and scientific terms used herein have the same meaning as commonly understood by one of ordinary skill in the art to which this invention belongs. Although suitable methods and materials are described below, methods and materials similar or equivalent to those described herein can be used in the practice of the present invention. In case of conflict, the patent specification, including definitions, will control. All materials, methods, and examples are illustrative only and are not intended to be limiting.

As used herein, the terms "comprising" and "including" or grammatical variants thereof are to be taken as specifying inclusion of the stated features, integers, actions or components without precluding the addition of one or more additional features, integers, actions, components or groups thereof. This term is broader than, and includes the terms "consisting of" and "consisting essentially of" as defined by the Manual of Patent Examination Procedure of the United States Patent and Trademark Office. Thus, any recitation that an embodiment "includes" or "comprises" a feature is a specific statement that sub-embodiments "consist essentially of" and/or "consist of" the recited feature.

The phrase "consisting essentially of" or grammatical variants thereof when used herein are to be taken as specifying the stated features, integers, steps or components but do not preclude the addition of one or more additional features, integers, steps, components or groups thereof but only if the additional features, integers, steps, components or groups thereof do not materially alter the basic and novel characteristics of the claimed composition, device or method.

The phrase "adapted to" as used in this specification and the accompanying claims imposes additional structural limitations on a previously recited component.

The term "method" refers to manners, means, techniques and procedures for accomplishing a given task including, but not limited to, those manners, means, techniques and procedures either known to, or readily developed from known manners, means, techniques and procedures by practitioners of architecture and/or computer science.

Implementation of the method and system according to embodiments of the invention involves performing or completing selected tasks or steps manually, automatically, or a combination thereof. Moreover, according to actual instrumentation and equipment of exemplary embodiments of methods, apparatus and systems of the invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

Percentages (%) of chemicals are w/w (weight per weight) unless otherwise indicated.

BRIEF DESCRIPTION OF THE DRAWINGS

In order to understand the invention and to see how it may be carried out in practice, embodiments will now be described, by way of non-limiting example only, with reference to the accompanying figures. In the figures, identical and similar structures, elements or parts thereof that appear in more than one figure are generally labeled with the same or similar references in the figures in which they appear. Dimensions of components and features shown in the figures are chosen primarily for convenience and clarity of presentation and are not necessarily to scale. The attached figures are.

DETAILED DESCRIPTION OF EMBODIMENTS

Embodiments of the invention relate to electrochemical bonding methods and apparatus.

Specifically, some embodiments of the invention can be used to produce porous 3D metal structures. According to various exemplary embodiments of the invention these porous 3D metal structures are engineered for use in a variety of electrochemical and non-electrochemical application. Electrochemical applications include, but are not limited to, batteries, fuel cells and electrolyzers. Non-electrochemical applications include, but are not limited to, miniaturized heat exchangers, catalyst support and others.

The principles and operation of method and/or apparatus according to exemplary embodiments of the invention may be better understood with reference to the drawings and accompanying descriptions.

Before explaining at least one embodiment of the invention in detail, it is to be understood that the invention is not limited in its application to the details set forth in the following description or exemplified by the Examples. The invention is capable of other embodiments or of being practiced or carried out in various ways. Also, it is to be understood that the phraseology and terminology employed herein is for the purpose of description and should not be regarded as limiting.

Overview

Figure 1:
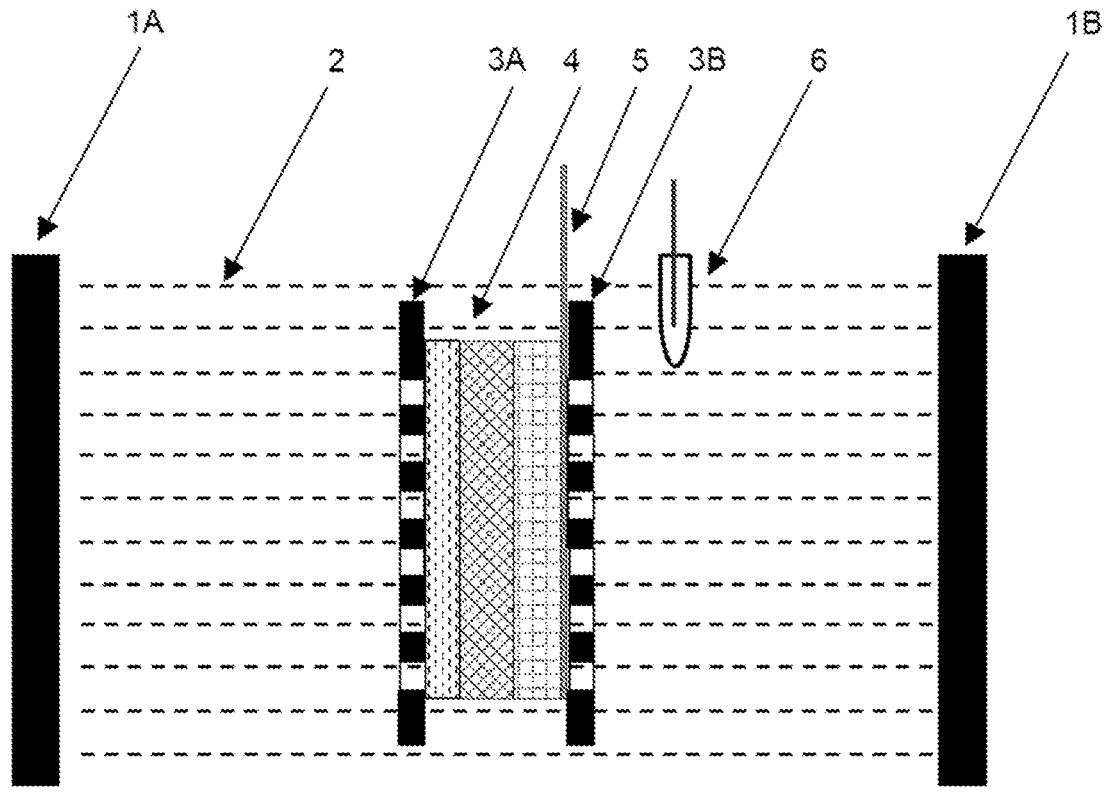
FIG. 1 is a schematic cross sectional view of a device for liquid cold welding (LCW) according to some embodiments of the invention.

FIG. 1 is a simplified schematic representation of a device for liquid cold welding (LCW) process. The device of FIG. 1 stacks a plurality of porous conductive layers 4 between nonconductive frames 3A and 3B. Frames 3A and 3B exert pressure on layers 4 to ensure good multiple mechanical and electrical contacts between the stacked layers 4 themselves as well as with a working electrode (WE) 5. In some embodiments two or more WEs are employed. Items 3A, 3B, 4 and 5 comprise a working electrode assembly (WEA). The WEA is placed into liquid aqueous or non-aqueous electrolyte 2 between two counter electrodes CE 1A and 1B. In some embodiments there is only one CE. In other embodiments the number of CEs is more than two.

According to various exemplary embodiments of the invention WEs are fully or partially immersed in the electrolyte 2. In some embodiments contact between WE 5 and electrolyte 2 is minimized yet a good contact between it and substrates in WEA is ensured. By applying negative current, voltage or power on WE and positive current, voltage or power on CEs a metal ions in the electrolyte 2 begin to deposit on every substrate that is in electrical contact with WE.

As a metal or metal alloy layer grows on different substrates 4 the metal or metal alloy forms a bonding layer between substrates 4.

According to various exemplary embodiments of the invention the thickness and morphology of this bonding layer is controlled by varying electrolyte composition (optionally including one or more different additives) and/or metal ion type and/or metal ion concentrations and/or pH and/or temperature and/or flow rate of electrolyte and/or stirring of electrolyte and/or current density and/or voltage and/or power. According to various exemplary embodiments of the invention the electrolyte is aqueous or non-aqueous contains dissolved metal ions such as, for example, copper, nickel, zinc and others.

In the depicted embodiment, reference electrode RE 6 controls voltage between WE 5 and RE 6 by adjusting current between CEs 1A and 1B and WE 5. Examples of aqueous REs include, but are not limited to, Ag/AgCl, $Hg/Hg_2Cl_2$, Hg/HgO.

Exemplary Materials

According to various exemplary embodiments of the invention WEs 5 are constructed of any electronically conductive material provided it is stable in the electrolyte and the bonded 3D electrode can be easily detached from it. For example, stainless steel, titanium, niobium, carbon and composite carbon-polymer conductive materials are suitable for use in the context of various embodiments of the invention.

There are two types of CEs (e.g. 1A and 1B in FIG. 1) that can be used for LCW.

The first type is a consumable metallic CE that dissolves during the LCW process. As a result of dissolution, a chemical composition of a bonding layer will also include metals dissolved from CE. According to various exemplary embodiments of the invention consumable metallic CEs are constructed from metals including, but not limited to, Zn, Ni, Co, Fe, Pb, Cu, Sn, Cr, Mn and their alloys.

The second type of CEs is made of, or covered with, materials that do not dissolve during the LCW process but rather catalyze the reaction of electrolyte oxidation. Examples of such materials include but are not limited to TI, Nb, W, Mo and V coated by a few micron thick layer of Au, Pt, Ir, Ru or any other noble metal capable of electrocatalytically oxidizing the solvent in electrolyte 2 (water or any other solvent). With the second type of CEs, processes associated with metal deposition are sensitive to changes in pH (in the case of an aqueous electrolyte 2) of the electrolyte. In some embodiments, addition of a sufficient amount of metal ions that are reduced to form a bonding layer between porous substrates is required. Alternatively or additionally, in some embodiments pH adjustment is required.

Exemplary Working Electrodes (WE) and Conductive Frames

Figure 2:
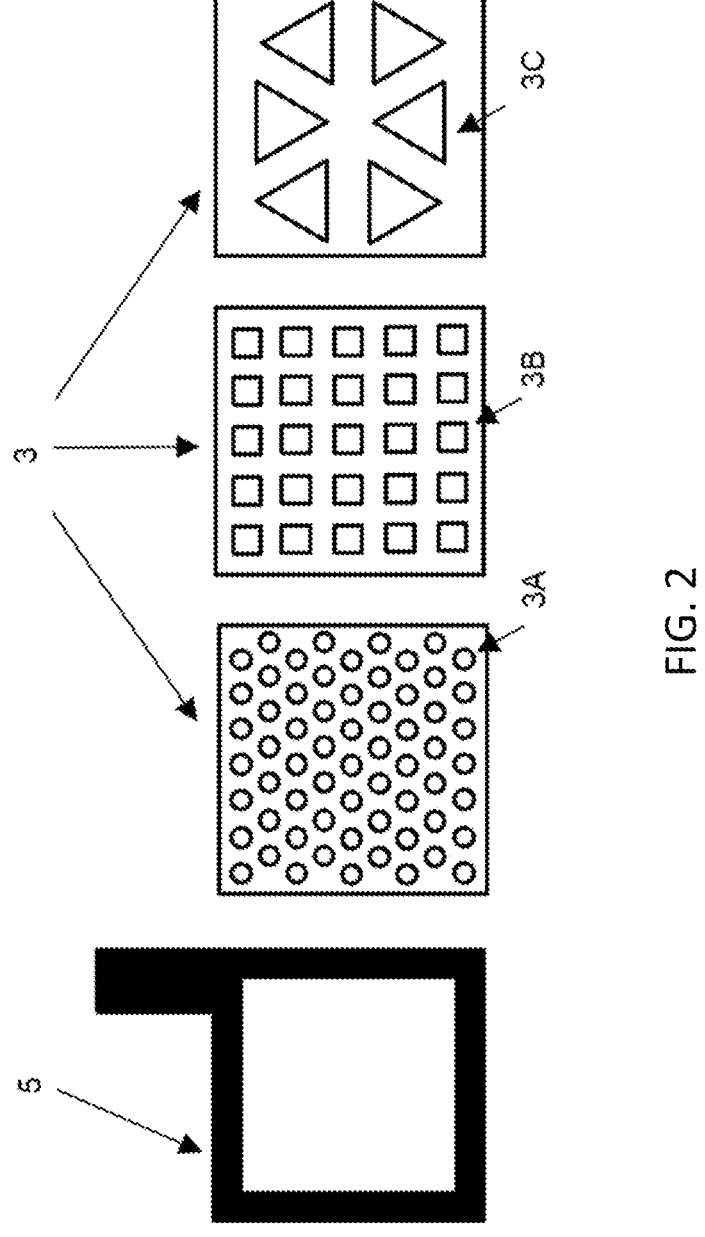
FIG. 2 is a schematic representation illustrating shapes for working electrode (WE) and nonconductive frames according to various embodiments of the invention.

FIG. 2 is a schematic representation illustrating shapes for WE (5) and nonconductive frames (3) according to various embodiments of the invention. The size of apertures in (3) can vary from tens of microns to tens of centimeters depending on overall electrodes sizes. Alternatively or additionally, according to various exemplary embodiments of the invention the apertures have different shapes including, but not limited to round (3A), square (3B) and triangular (3C). According to various exemplary embodiments of the invention the number of apertures varies from one to tens, hundreds or more.

FIG. 2. is illustrative only and does not cover all possible shapes and sizes but provides guidance for fabrication of frames 3 and electrodes 5. Number of apertures per plate and their size will define the rate of electroplating in those areas. For example, to reduce the weight of deposited material, number of apertures and/or aperture size can be reduced.

According to various exemplary embodiments of the invention holes in frames 3 are placed to: produce uniform attachment across the porous substrate; or only in specific areas so the substrates will only be attached at pre-defined locations.

Alternatively or additionally, in some embodiments a shape of frame 3 is tailored in accordance with the shape of the substrate. Alternatively or additionally, in some embodiments the number of the holes per unit area in frame 3 is adjusted to change bonding forces. Alternatively or additionally, in some embodiments frames 3 are made from machined dielectric material somehow or from metal coated with dielectric material.

Exemplary Electrolyte Flow Considerations

In some embodiments, in order to improve permeation of electrolyte 2 in stacked porous layers (4 in FIG. 1) the electrolyte is forced to flow through the apertures by means of applied pressure (e.g. from a pump).

First Exemplary Device

Figure 3:
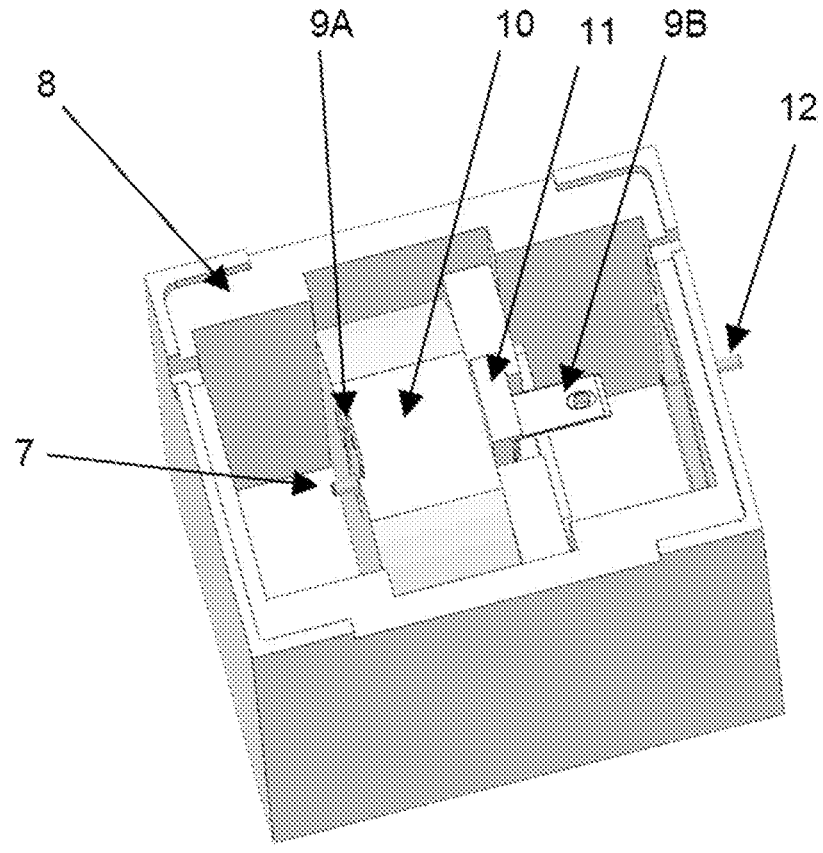
FIG. 3 is a perspective view from above of a device for liquid cold welding (LCW) according to some embodiments of the invention.

FIG. 3 is a perspective view from above of an exemplary device that provides a forced flow of the electrolyte passing through the stacked porous layers (4 in FIG. 1) In the depicted embodiment, the electrolyte is pumped through inlet 7 into a closed compartment 10 containing parts 3, 4, and 5 of FIG. 1. WE (5; not visible) inside compartment 10 is in electrical contact with external negative terminal 11 while CEs (1; not visible) are connected to external positive terminals 9. Compartment 10 is located inside an electrolytic bath 8. Electrolyte leaving compartment 10 fills bath 8 and is pumped out via electrolyte outlet 12. This device enables LCW of manually loaded porous samples to fabricate porous 3D substrates.

Second Exemplary Device

Figure 4A:
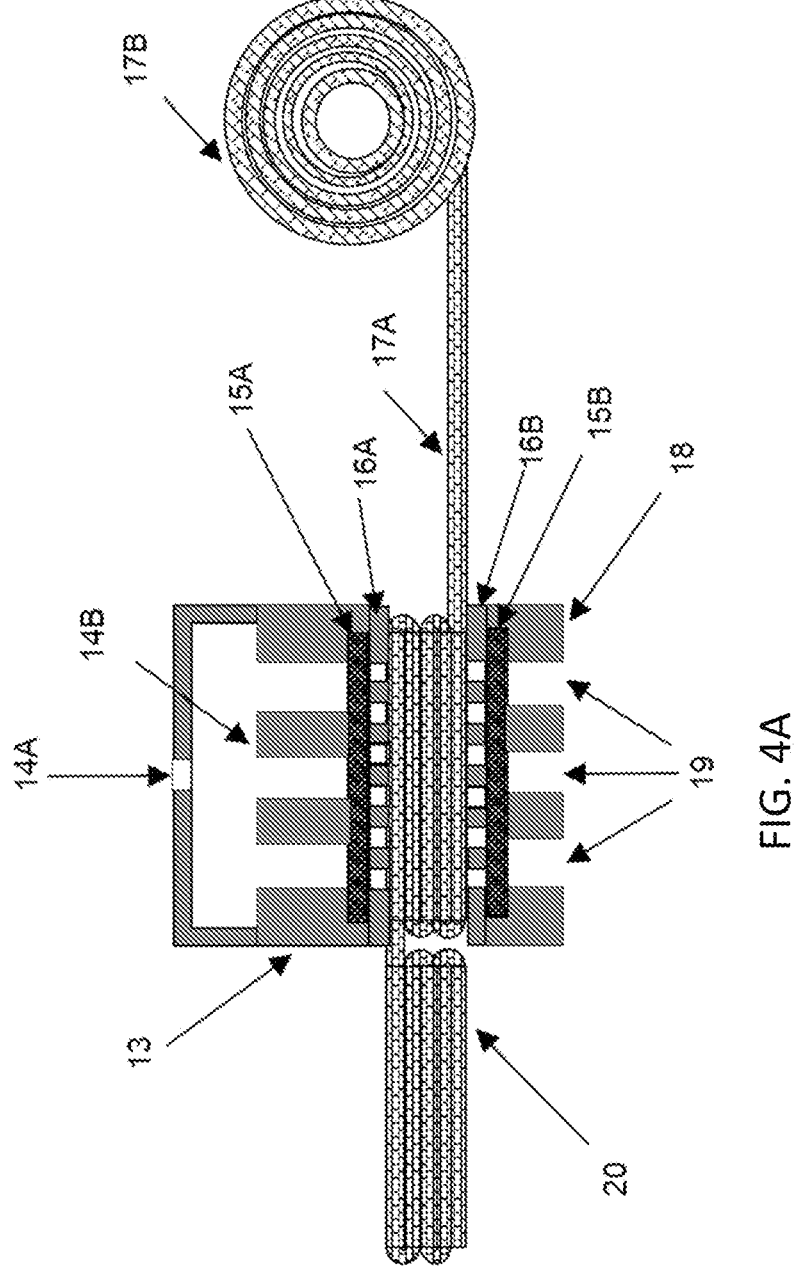
FIG. 4A is a simplified schematic representation of a device for continuous production of 3D substrates from rolled or stacked porous films according to some embodiments of the invention.

FIG. 4A schematically presents a device for continuous production of 3D substrates from rolled or stacked porous films. In the depicted embodiment, a single layer porous film 17A is folded to form layers and then fed between two CEs 15A and 15B. CE 15A is mounted inside a compartment 13 that can move vertically and/or horizontally in some embodiments to accommodate folded porous films 17A. CEs 15A and 15B are porous to enable electrolyte flow. During the process of LCW compartment 13 exerts a pressure on folded layers 17A that act as WE to ensure mechanical and electrical contact between the folded layers. Compartment 13 has an inlet 14A and flow distributors 14B to ensure a homogenous flow of pressurized electrolyte flowing through CE 15A and non-conductive plate 16A, through folded substrates 17A and non-conductive plate 16B and CE 15B that are mounted in a bottom compartment 18. The flow and/or pressure of electrolyte is governed by a pump (Not depicted). The electrolyte is then collected from outlets 19 and circulated back through the inlet 14A. Some embodiments are equipped with electrolyte storage (not depicted) where the collected electrolyte is pumped first before being pumped back through the inlet 14A. Upon completion of the LCW, the bonded layers (20) are moved out and the new folded layers 17A are fed in to the compartments 13 and 18 thus providing a continuous process for formation of 3D porous substrates. In the depicted embodiment, 17A is fed from a roll 17B. According to various exemplary embodiments of the invention the folding process is done manually, semi-automatically or using a fully automatic specialized robotic device installed to carry out folding of certain lengths of the substrate.

Figure 4B:
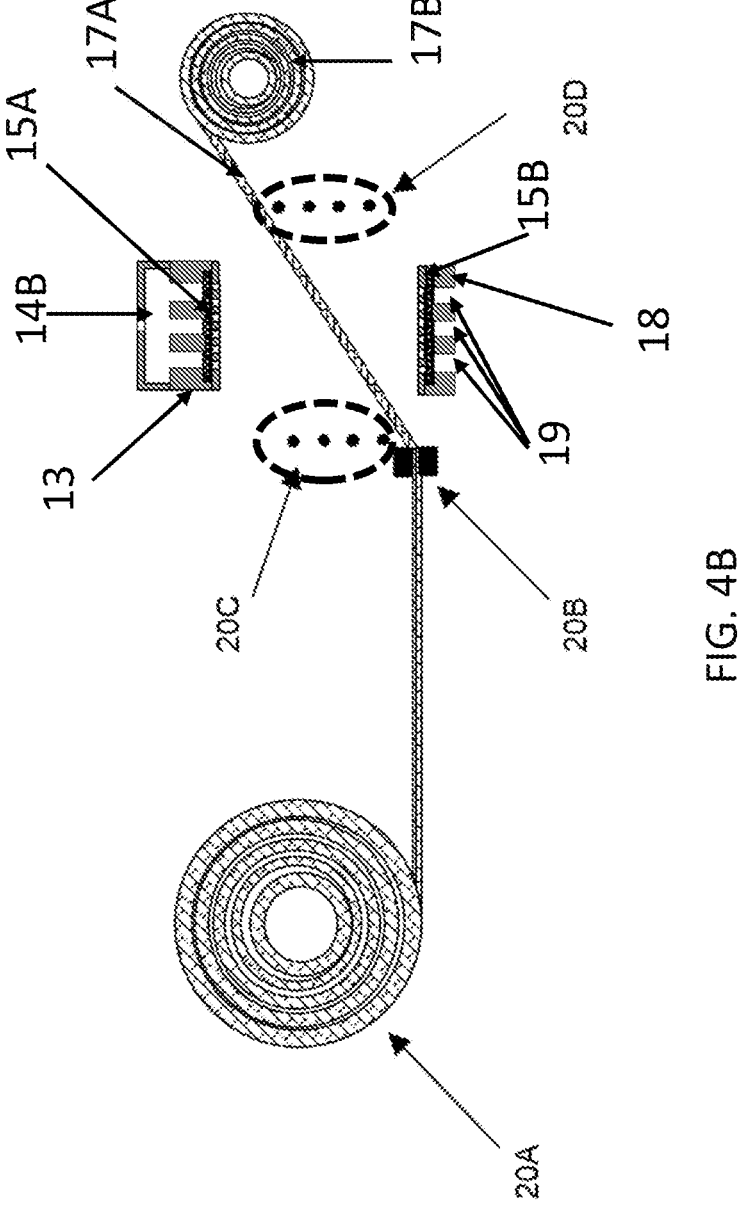
FIG. 4B is a simplified schematic representation of a device for continuous production of folded 3D substrates from rolled porous films according to some embodiments of the invention.

FIG. 4B is a simplified schematic representation of a device for continuous production of folded 3D substrates from rolled porous films according to some embodiments of the invention. The depicted device is the device of FIG. 4A with a retractable clamp 20B that closes to hold substrate 17A in position. The folding mechanism includes 2 arrays of retractable rods 20C and 20D. The folding mechanism begins by moving the lowest rod from 20C to the right so that it engages and pushes substrate 17A rightwards. At the same time the lowest rod from 20D to the left so that it engages and pushes substrate 17B leftwards. This process is repeated with the next lowest rod from 20C and the next lowest rod from 20D.

Figure 4C:
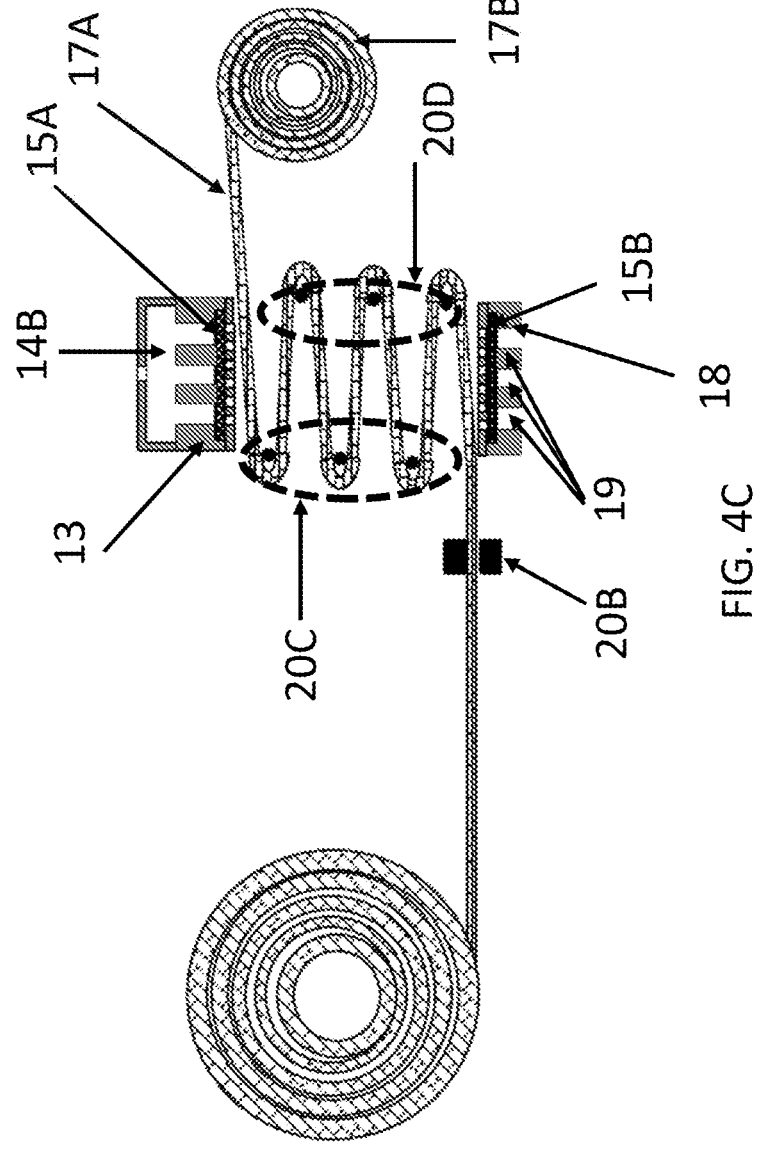
FIG. 4C is a simplified schematic representation of a device for continuous production of folded 3D substrates from rolled porous films as in FIG. 4B illustrating operation of an exemplary folding mechanism.

FIG. 4C illustrates the appearance of substrate 17A after all the rods originally in 20C have moved to the right and all of the rods in 20D have moved to the left.

Figure 4D:
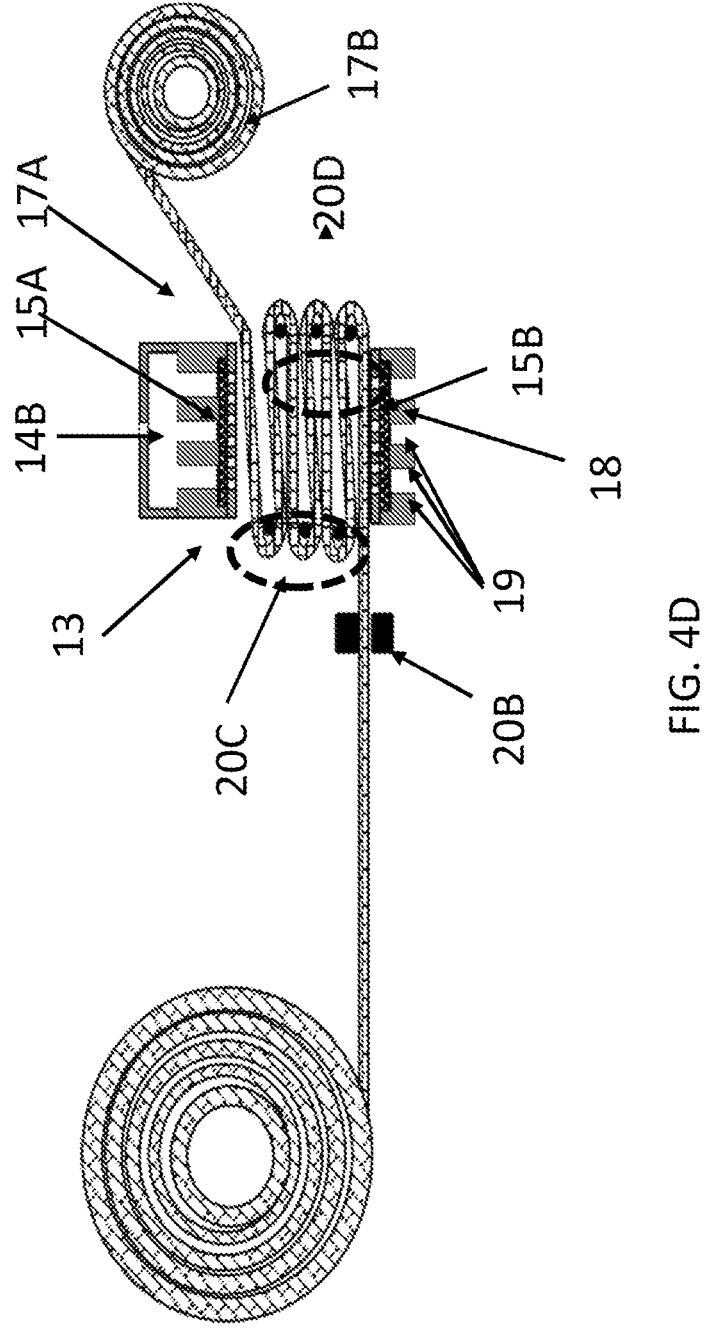
FIG. 4D is a simplified schematic representation of a device for continuous production of folded 3D substrates from rolled porous films as in FIGS. 4B and 4C illustrating compression of a stack of folded substrate.

FIG. 4D illustrates compression of the folded substrate 17A by decreasing the distance between 15A and 15B.

Figure 4E:
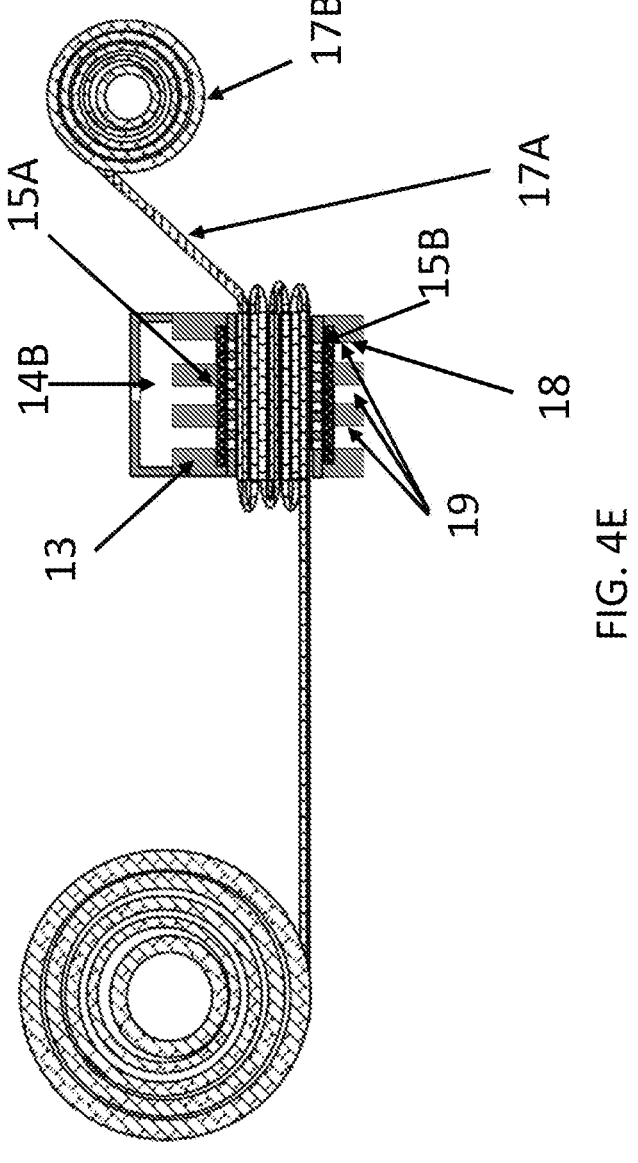
FIG. 4E is a simplified schematic representation of a device for continuous production of folded 3D substrates from rolled porous films as in FIGS. 4B, 4C and 4D illustrating a fully compressed stack of folded substrate.

FIG. 4E shows the folded substrate 17A fully compressed with rods of 20C and 20D retracted. This configuration is similar to that depicted in FIG. 4A.

Third Exemplary Device

Figure 5A:
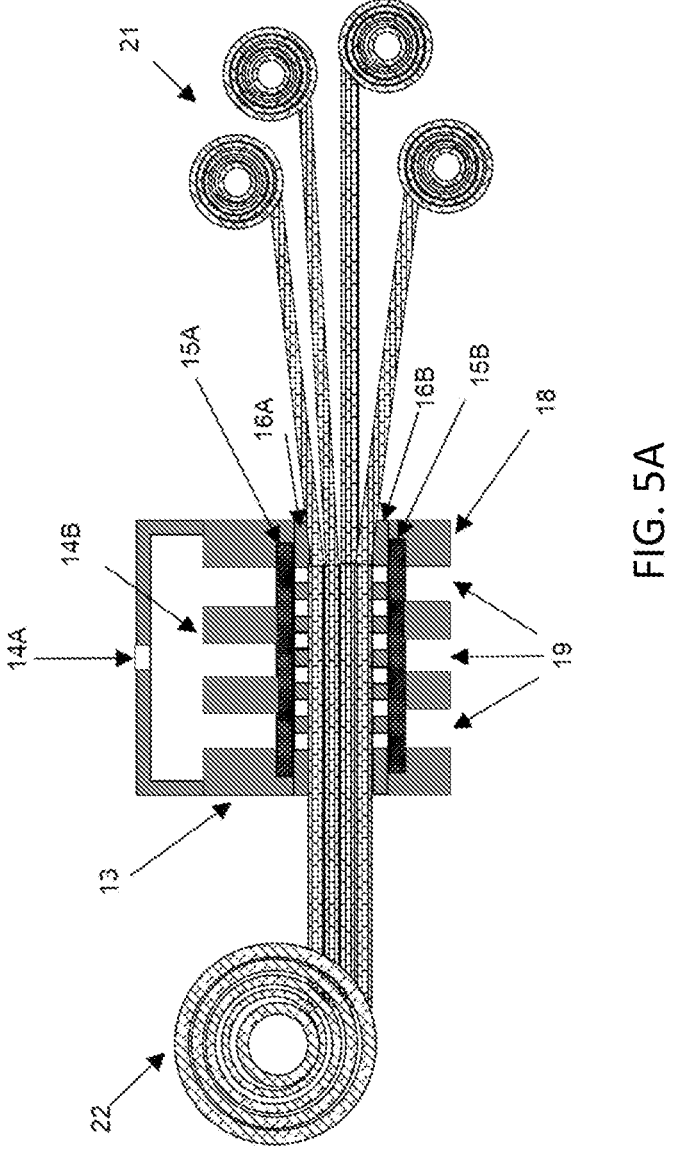
FIG. 5A is a simplified schematic representation of a device for continuous production of 3D substrates from rolled or stacked porous films according to some embodiments of the invention.

FIG. 5A schematically presents a device for continuous production of 3D substrates from multiple layers from different sources (e.g. rollers 21, or stacked). In the depicted embodiment, layers from rollers 21 are fed in to the device for LCW as indicated. Upon completion of the LCW the bonded 3D porous substrate leaves the compartments (14 and 18) and allows the next multilayer substrates to be bonded providing a continuous fabrication process. In the depicted embodiment, take-up roller 22 spools fabricated 3D substrate after LCW. Other reference numerals in FIG. 5A are as described hereinabove in the context of FIG. 4A.

In the depicted embodiment, the device includes two or more feed rollers 21 adapted to feed two or more porous conductive substrate layers concurrently between perforated non-conductive frames 16A; and an uptake roller 22 adapted to spool said two or more porous conductive substrate layers after LCW as a bonded substrate.

In the depicted embodiment, the device includes a distance regulation mechanism (not depicted) adapted to adjust a distance between perforated non-conductive frames 16A. In some embodiments increasing the distance between frames 16A facilitates insertion and/or removal of the two or more porous conductive substrate layers. Alternatively or additionally, in some embodiments decreasing the distance between perforated non-conductive frames 16A causes the substrate layers to contact one another during welding.

Fourth Exemplary Device

Figure 5B:
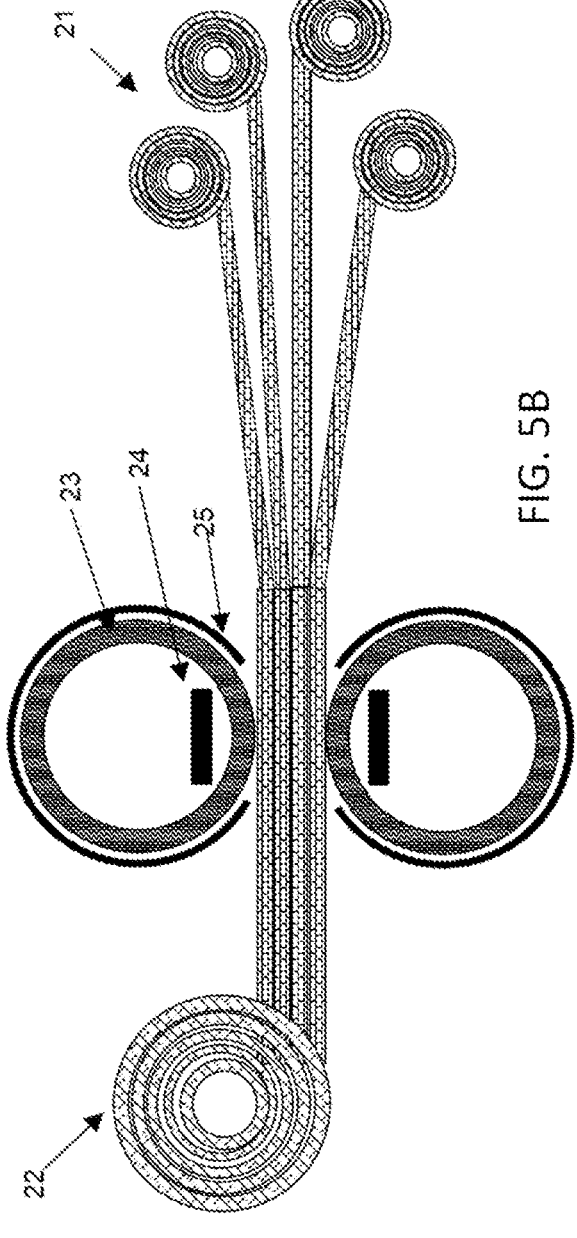
FIG. 5B is a simplified schematic representation of another device for continuous production of 3D substrates from rolled or stacked porous films according to some embodiments of the invention.

FIG. 5B schematically presents a device for continuous production of 3D substrates from multiple layers from different sources (e.g. rollers 21, or stacked). In the depicted embodiment, feeding rollers 21 provide a plurality of porous 2D samples to deposition rollers including at least three parts as indicated in the figure.

In the depicted embodiment, the deposition rollers include counter electrodes 24 inside porous non-conductive cylinders 23 surrounded by covers 25. Pores in cylinders 23 vary in the size between 50 um and 10 cm depending on the size of cylinder 23.

During use electrolyte solution is pumped to cylinders 23 and exits via the pores. The current/voltage/power is applied between electrodes 24 and the 2D substrates to cause metal deposition in the area between 24 and the substrates. Covers 25 prevent spilling of electrolyte solution electrolyte. As rollers 21 and/or 22 rotate the next portion of 2D substrate is electrochemically bonded with the resulting 3D film winding on receiving roller 22. LCW of substrate layers is regulated by electrolyte composition and/or current/voltage/power and/or temperature and/or pore sizes in cylinders 23 and/or number of pores in cylinders 23 and/or pumping rate of the electrolyte and/or rotational speed of cylinders 23. In some embodiments, this device operates continuously, as opposed to in discrete increments. In some exemplary embodiments more than two rollers having features 23, 24 and 24 are installed.

Exemplary Method

Figure 5C:
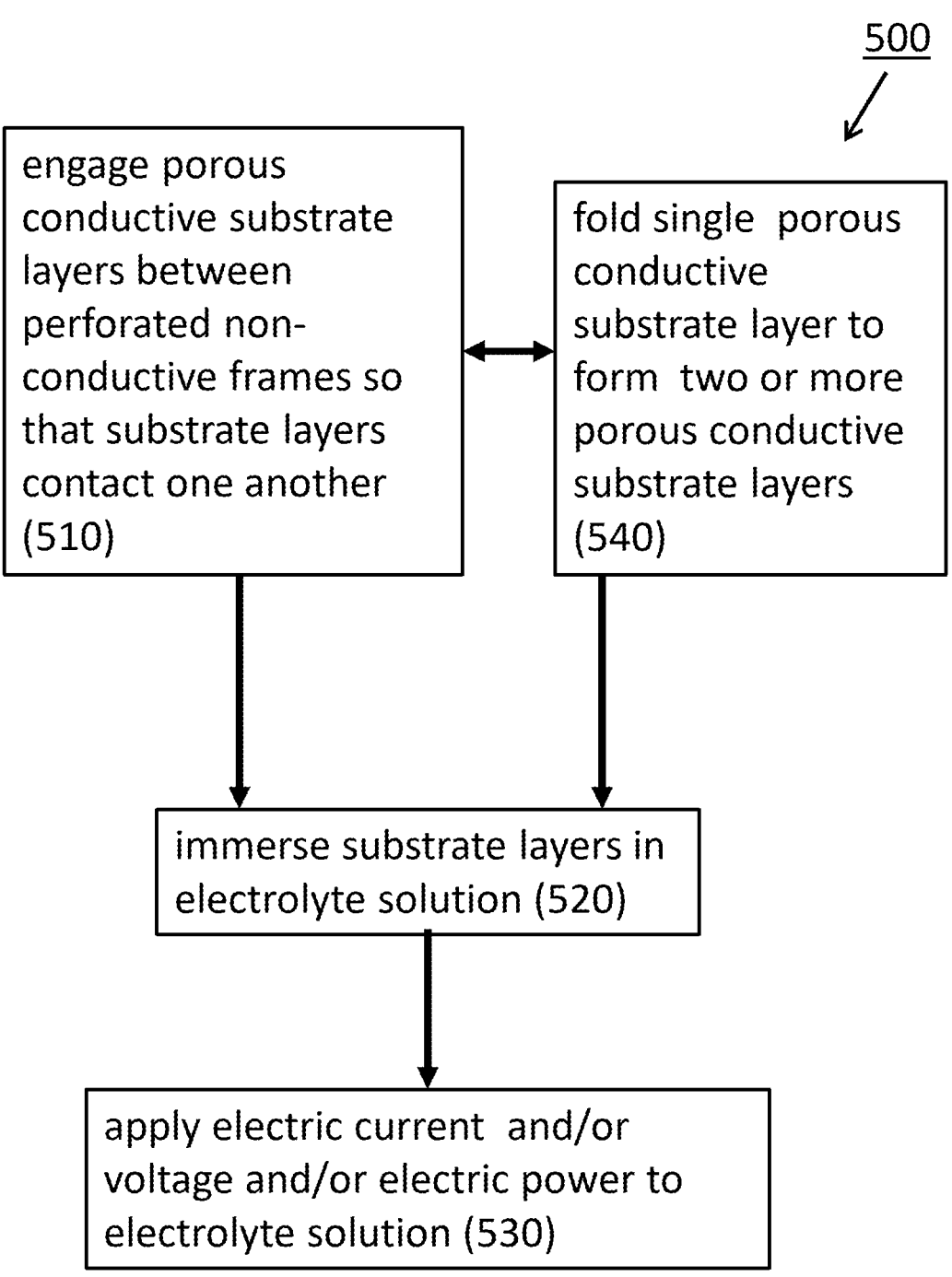
FIG. 5C is a simplified flow diagram of a method according to some embodiments of the invention.

FIG. 5C is a simplified flow diagram of a method, indicated generally, as 500, for electrochemical bonding indicated generally as 500.

In the depicted embodiment, method 500 includes, engaging 510 two or more porous conductive substrate layers between perforated non-conductive frames so that the substrate layers contact one another. In some embodiments a single layer is folded as in FIG. 4A. Alternatively or additionally, in some embodiments layers from different sources are introduced as in FIGS. 5A and 5B.

According to various exemplary embodiments of the invention the substrate layers are of the same or different material. Alternatively or additionally, the substrate layers are of the same or different thickness.

Depicted method 500 also includes immersing 520 the substrate layers in an electrolyte solution and applying 530 electric current and/or voltage and/or electric power to said electrolyte solution. According to various exemplary embodiments of the invention method 500 is performed using a device as depicted in FIG. 1, FIG. 4A, 5A or 5B.

In some embodiments applying 530 includes applying an electric current flowing from one CE (e.g. 15A), to said porous metal substrate layers 17A acting as WE between perforated non-conductive frames.

According to various exemplary embodiments of the invention the current is constant or pulsed. According to various exemplary embodiments of the invention different pulse sequences are employed including, but not limited to pulse reversal.

In some embodiments applying 530 includes applying a voltage using a reference electrode (e.g. 6). In some embodiments, the applied voltage is constant.

In some embodiments applying 530 includes applying power. In some embodiments, the applied power is constant.

In some embodiments, method 500 includes feeding two or more porous conductive substrate layers concurrently between perforated non-conductive frames; and withdrawing the two or more porous conductive substrate layers after LCW as a bonded substrate as depicted in FIGS. 5A and/or 5B. Alternatively or additionally, in some embodiments method 500 includes Increasing a distance between perforated non-conductive frames 16A to facilitate insertion and/or removal of said two or more porous conductive substrate layers. Alternatively or additionally, in some embodiments method 500 includes decreasing a distance between perforated non-conductive frames 16A so that the substrate layers contact one another. Alternatively or additionally, in some embodiments method 500 includes pumping the electrolyte solution through the perforated non-conductive frames and said substrate layers during applying 530.

Alternatively or additionally, in some embodiments method 500 includes folding 540 a single porous conductive substrate layer to form two or more porous conductive substrate layers. In some embodiments, perforated isolators are inserted between the folded layers. In some embodiments, the perforated isolators contribute to an ability to separate layers from the folded stack after LCW.

It is expected that during the life of this patent many new electrode types and/or electrolyte solutions will be developed and the scope of the invention is intended to include all such new technologies a priori.

As used herein the term "about" refers to ±10%.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

Specifically, a variety of numerical indicators have been utilized. It should be understood that these numerical indicators could vary even further based upon a variety of engineering principles, materials, intended use and designs incorporated into the various embodiments of the invention. Additionally, components and/or actions ascribed to exemplary embodiments of the invention and depicted as a single unit may be divided into subunits. Conversely, components and/or actions ascribed to exemplary embodiments of the invention and depicted as sub-units/individual actions may be combined into a single unit/action with the described/depicted function.

Alternatively, or additionally, features used to describe a method can be used to characterize an apparatus and features used to describe an apparatus can be used to characterize a method.

It should be further understood that the individual features described hereinabove can be combined in all possible combinations and sub-combinations to produce additional embodiments of the invention. The examples given above are exemplary in nature and are not intended to limit the scope of the invention which is defined solely by the following claims.

Each recitation of an embodiment of the invention that includes a specific feature, part, component, module or process is an explicit statement that additional embodiments of the invention not including the recited feature, part, component, module or process exist.

Alternatively or additionally, various exemplary embodiments of the invention exclude any specific feature, part, component, module, process or element which is not specifically disclosed herein.

Specifically, the invention has been described in the context of manufacturing of 3D porous substrates but might also be used in preparation of jewelry or other decorative items.

All publications, references, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The terms "include", and "have" and their conjugates as used herein mean "including but not necessarily limited to".

Additional objects, advantages, and novel features of various embodiments of the invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

EXAMPLES

Reference is now made to the following examples, which together with the above descriptions; illustrate the invention in a non-limiting fashion.

Example 1

Effect of Current on Porosity in LCW Fabrication

In order to examine the effect of applied current on the porosity of a porous 3D metal structures produced according to various embodiments of the invention 3 pieces of porous nickel films each 50 um thick were subjected to LCW in a device as depicted in FIGS. 1 and 5. The electrolyte was standard Watts electrolyte commonly used for Ni electroplating.

Figure 6B:
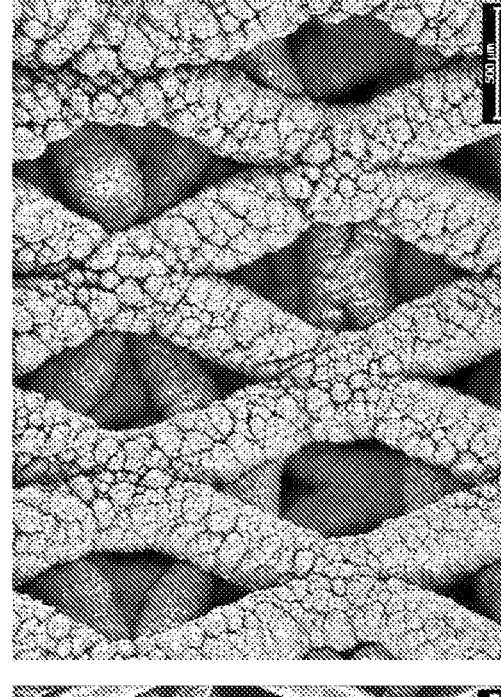
FIG. 6B is a photomicrograph of porous nickel films subjected to LCW according to another embodiment of the invention.
Figure 6B:
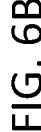
Figure 6A:
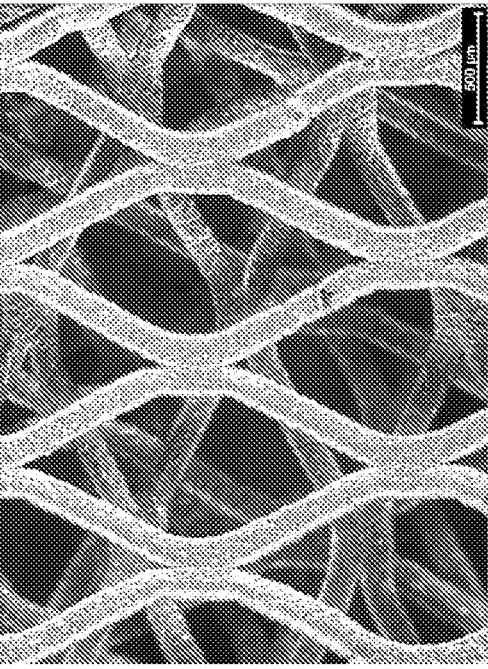
FIG. 6A is a photomicrograph of porous nickel films subjected to LCW according to an embodiment of the invention.

In one case constant current density of 300 mA/cm$^2$ was applied for 2 hours. Final porosity was 70% (FIG. 6A).

In another case constant current density of 600 mA/cm$^2$ was applied for 2 hours. Final porosity was 46% (FIG. 6B). The morphology of a bonding layer is different and the layer appears to have a higher surface area.

% Porosity was estimated based on weight and volume of samples before deposition and after.

This example illustrates that increasing applied current contributes to a decrease porosity of the resultant product. Alternatively or additionally, this example illustrates that that 3D substrates with at least 150 um thickness and unique morphology can be produced via LCW and that porosity and morphology can be controlled via current.

Example 2

Exemplary Use of a Reference Electrode in LCW Fabrication

In order to evaluate the possibility of using a reference electrode to control the porosity of a porous 3D metal structures produced according to various embodiments of the invention five pieces of porous nickel films each 50 um thick were subjected to LCW in a device as depicted in FIGS. 1 and 5. The electrolyte was standard Watts solution commonly used for Ni electroplating.

Figures 7A, 7B:
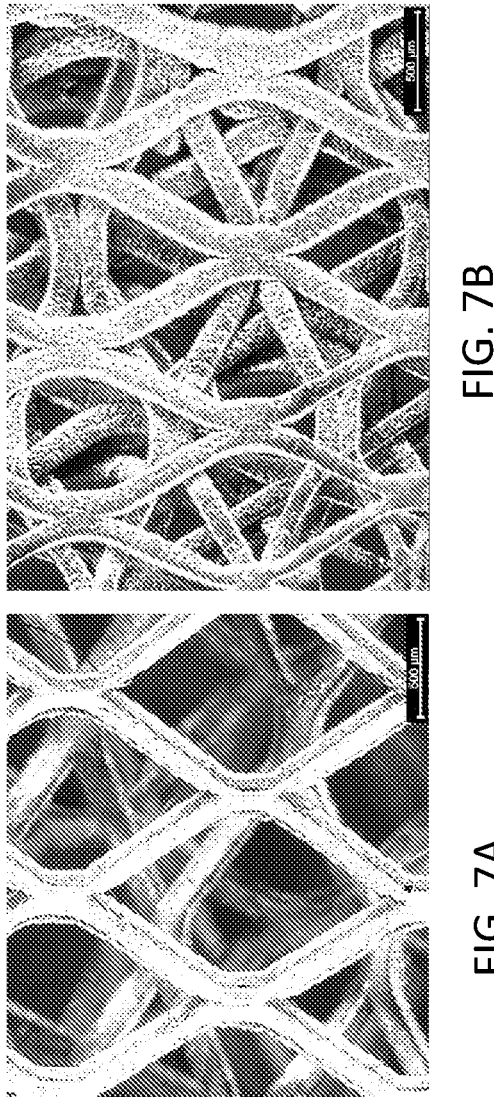
FIG. 7A is a photomicrograph of porous nickel films subjected to LCW according to an embodiment of the invention.
FIG. 7B is a photomicrograph of porous nickel films subjected to LCW according to an embodiment of the invention.

In one case constant current density of 400 mA/cm$^2$ was applied for 2 hour and final porosity was 85% (FIG. 7A).

In another case constant voltage of −4 V vs Ag/AgCl reference electrode was applied for 2 hours duration (FIG. 7B).

This example illustrates that 3D structures formed via LCW can also be created under potential-controlled regime using a reference electrode. Alternatively or additionally, this example illustrates that 3D substrates with at least 250 um thickness and unique morphology can be produced and that their porosity and morphology can be controlled using a reference electrode.

Example 3

Exemplary Use of Layers with Different Properties in LCW Fabrication

In order to evaluate the effect of using layers with different properties on a resultant porous 3D metal structure produced according to an embodiment of the invention a 500 um thick layer of nickel foam was sandwiched between 2 pieces of porous nickel films each 50 um thick and subjected to LCW in a device as depicted in FIGS. 1 and 5 using constant current density of 400 mA/cm$^2$ applied for 2 hours. The electrolyte was standard Watts electrolyte commonly used for Ni electroplating.

Figure 8B:
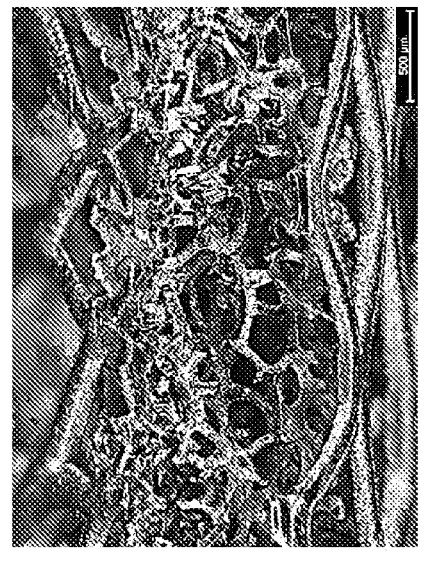
FIG. 8B is a photomicrograph (cross-sectional view) of the material of FIG. 8A.
Figure 8A:
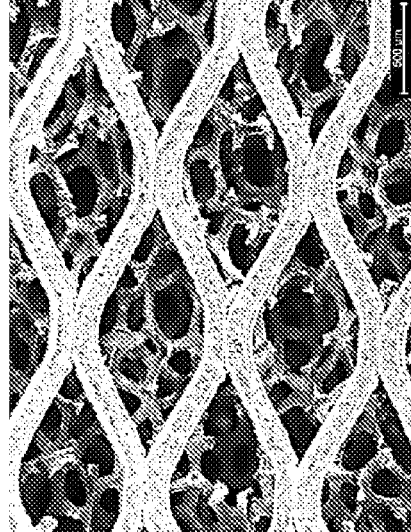
FIG. 8A is a photomicrograph (top view) of porous nickel foam sandwiched between porous nickel films subjected to LCW according to an embodiment of the invention.

FIG. 8A is a top view and FIG. 8B is a cross-sectional view of the resultant 3D substrate with a final porosity of 90%.

This example illustrates that thick (at least 600 um) 3D substrates can be formed via LCW method. Alternatively or additionally, this example illustrates that 2D and 3D porous metal films can be bonded together to produce porous 3D substrates with unique morphology.

Example 4

Effect of Duration of Current Application on the Resultant Product

Figure 9B:
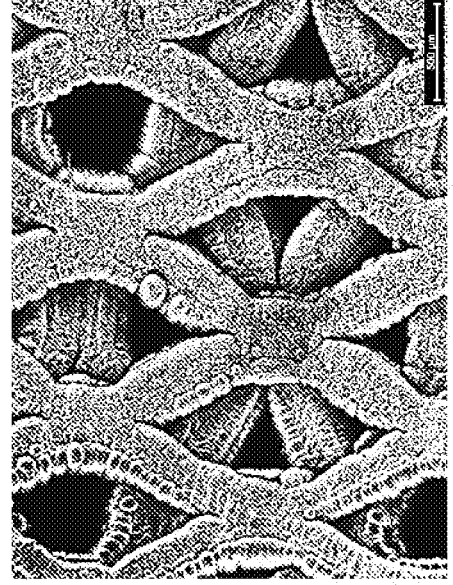
FIG. 9B is a photomicrograph of porous copper films subjected to LCW according to an embodiment of the invention.
Figure 9A:
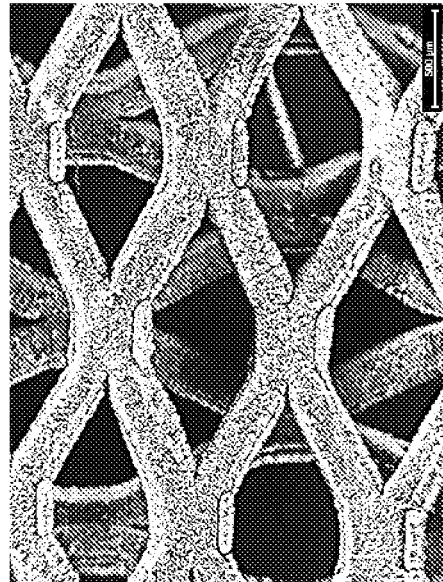
FIG. 9A is a photomicrograph of porous copper films subjected to LCW according to an embodiment of the invention.

In order to evaluate the effect of varying the amount of time that current is applied on a resultant porous 3D metal structure produced according to an embodiment of the invention 2 pieces of porous copper films each 50 um thick subjected to LCW in a device as depicted in FIGS. 1 and 5 using constant current density of 250 mA/cm$^2$ for 20 min (FIG. 9A) and 30 min (FIG. 9B) duration. The electrolyte was 1M CuSO$_4$ and 1M H$_2$SO$_4$.

This example illustrates that increasing fabrication time can lead to thicker but less porous samples.

Alternatively or additionally, this example illustrates that 3D substrates with at least 100 um thickness and unique morphology can be produced and that their porosity and morphology can be controlled through the duration of deposition.

Example 5

Fabrication of Multimetallic Nickel Aluminum Substrates

In order to evaluate the possibility of using porous aluminum films to produce a porous 3D metal structures according to an embodiment of the invention 3 pieces of porous aluminum films each 50 um thick were subjected to LCW in a device as depicted in FIGS. 1 and 5. The electrolyte was standard Watts electrolyte commonly used for Ni electroplating.

Constant current density of 200 mA/cm2 was applied for 2 hour

Figure 10B:
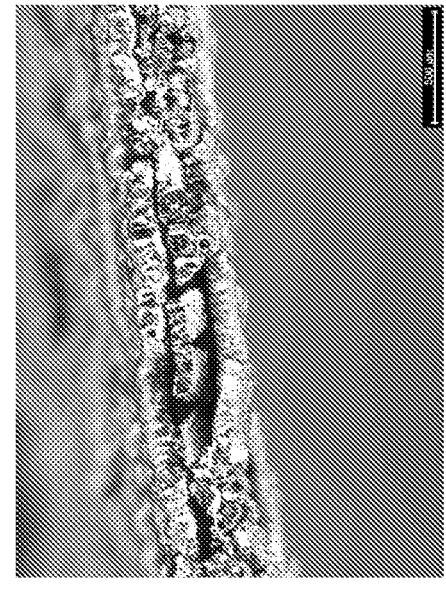
FIG. 10B is a photomicrograph (cross-sectional view) of porous aluminum films subjected to LCW according to an embodiment of the invention.
Figure 10A:
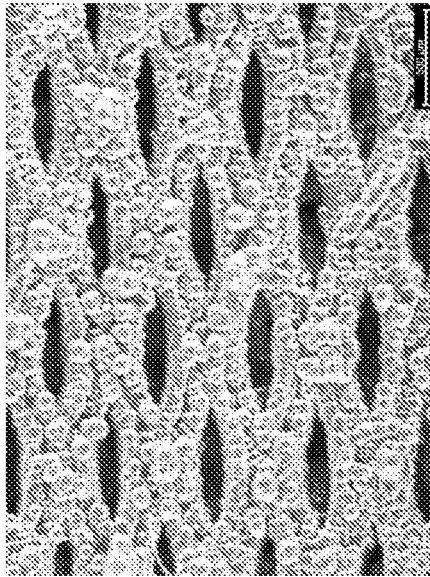
FIG. 10A is a photomicrograph (top view) of porous aluminum films subjected to LCW according to an embodiment of the invention.

FIG. 10A is a top view and FIG. 10B is a cross-sectional view of the resultant novel 3D porous Ni—Al multimetallic structures with unique morphology and physical properties that can be fabricated via LCW illustrating that morphology and properties can be controlled via applied current. This example illustrates that it is possible to fabricate 3D aluminum substrates using nickel electrolyte solution for LCW.

Alternatively or additionally, this example illustrates that 3D porous Ni—Cu multimetallic structures with unique morphology and physical properties can be fabricated via LCW and that their morphology and properties can be controlled via current.

Example 6

Fabrication of Multimetallic Nickel Copper Substrates

In order to evaluate the possibility of using porous copper films to produce a porous 3D metal structures according to an embodiment of the invention 5 pieces of porous copper films each 50 um thick were subjected to LCW in a device as depicted in FIGS. 1 and 5. The electrolyte was standard Watts electrolyte commonly used for Ni electroplating. Constant current density of 300 mA/cm$^2$ was applied for 2 hours.

Figure 11B:
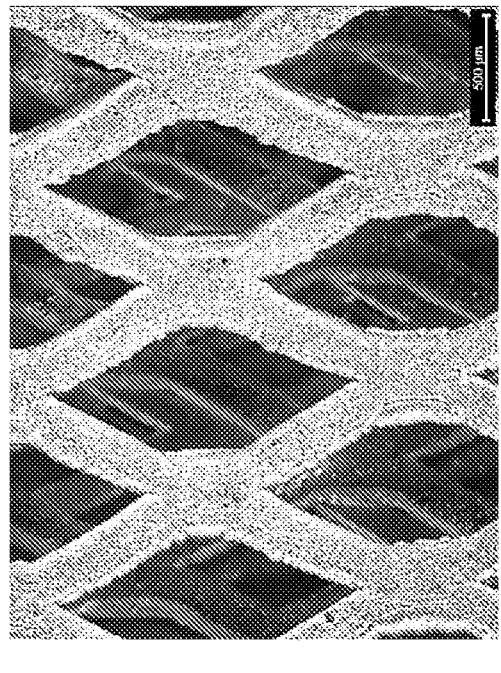
FIG. 11B is a close up of the sample in FIG. 11A.
Figure 11A:
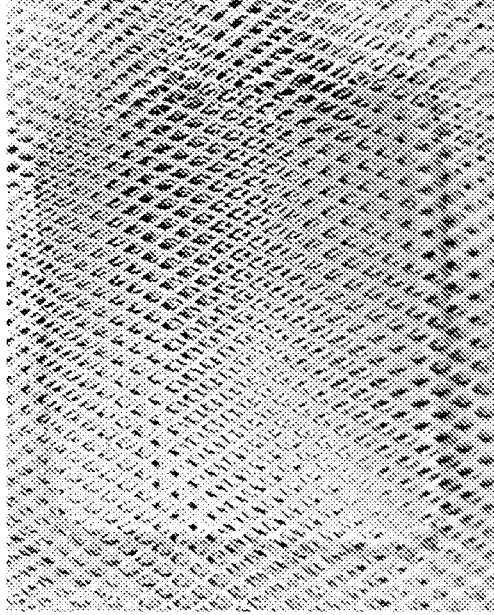
FIG. 11A is a photomicrograph of porous copper films subjected to LCW according to an embodiment of the invention.

FIG. 11A top view with active area of 20×20 mm and FIG. 11B is a zoomed-in view of the active area of FIG. 11A. This result confirms the possibility of bonding two different metals together with LCW as seen in Example 5.

This example illustrates that it is possible to fabricate 3D copper substrates in Nickel electrolyte and using nickel as a bonding material. This another example showing that different metals can bonded with different materials.

Example 7

Fabrication of 3D Substrates Via Localized/Selective LCW

In order to investigate the influence of pore size, plate porosity and current conditions on LCW quality and quantity, a series of experiments was conducted using a porous copper substrate and a copper electrolyte solution as in example 4.

Figure 12A:
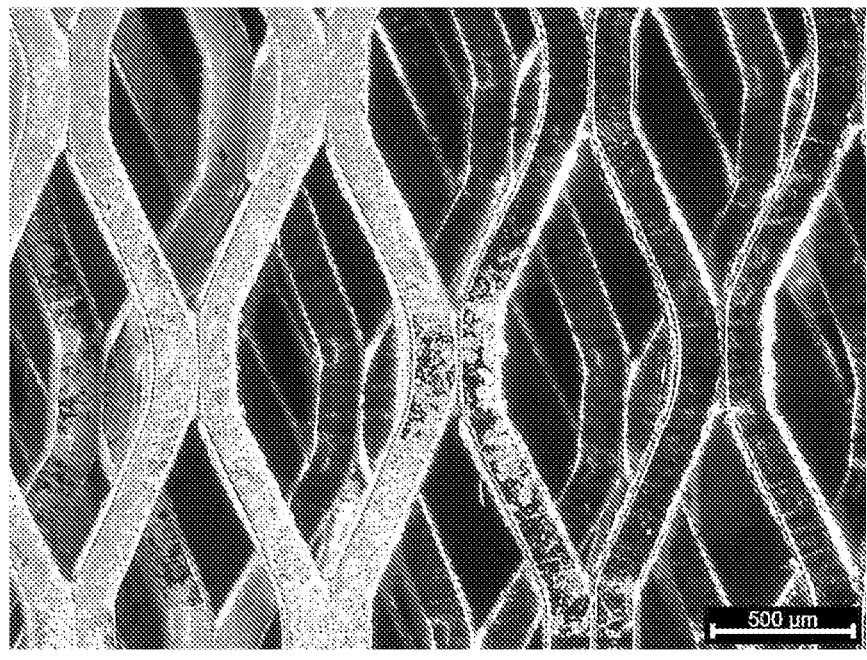
FIG. 12A is a photomicrograph of porous copper films subjected to LCW using a copper electrolyte solution according to an embodiment of the invention.

FIG. 12A is a photomicrograph depicting localized LCW of copper with copper electrolyte. In this experiment, non-conductive frames for were used for both inlet and outlet of a device as in FIG. 2 with round apertures of 2 mm and 18% open area. The deposition current was 200 mA/cm$^2$ and the duration 30 min. Three porous substrates were bonded. Total weight gain after the bonding was 12%. In this photograph, and subsequent panels, brighter parts indicate deposited material while dark parts are clear of deposition.

Figure 12B:
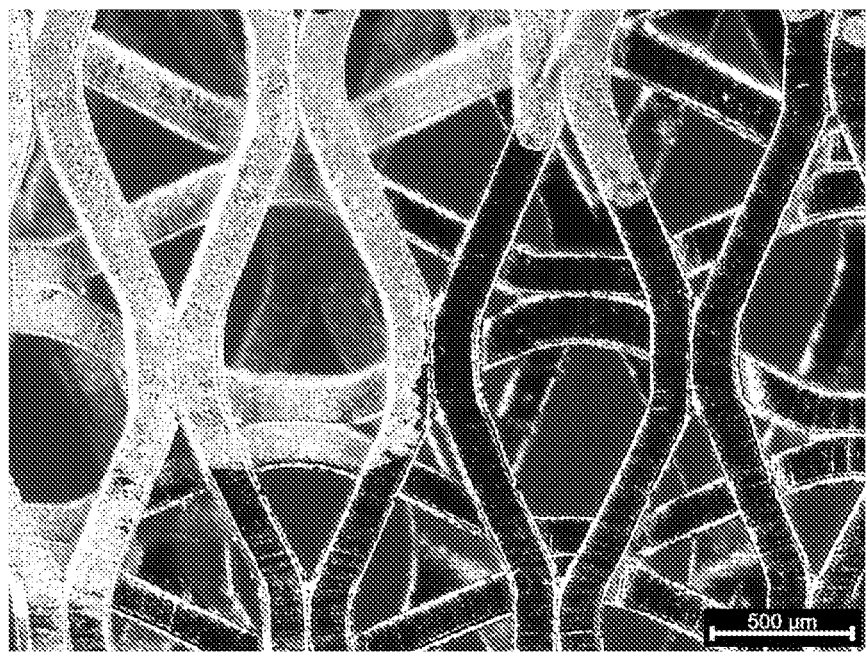
FIG. 12B is a photomicrograph of porous copper films subjected to LCW using a copper electrolyte solution according to an embodiment of the invention.

FIG. 12B is a photomicrograph depicting localized LCW of copper with copper electrolyte. In this experiment, non-conductive frames for were used for both inlet and outlet of a device as in FIG. 2 with round apertures of 1 mm and 4.5% open area. The deposition current was 100 mA/cm$^2$ and the duration 30 min. Three porous substrates bonded. Total weight gain after the bonding was 11%.

Figure 12C:
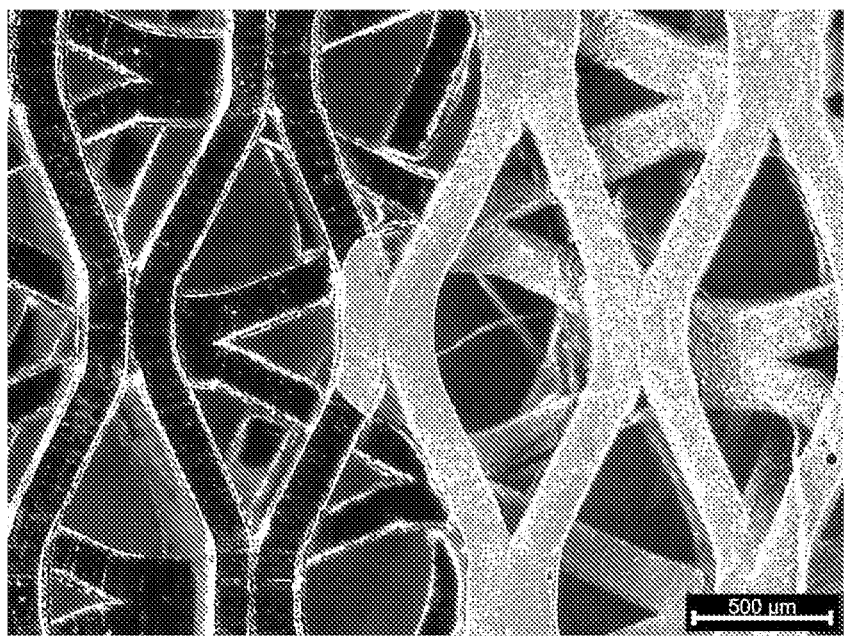
FIG. 12C is a photomicrograph of porous copper films subjected to LCW using a copper electrolyte solution according to an embodiment of the invention.

FIG. 12C is a photomicrograph depicting localized LCW of copper with copper electrolyte. In this experiment, non-conductive frames for were used for both inlet and outlet of a device as in FIG. 2 with round apertures of 3 mm and 40% open area. The deposition current was 100 mA/cm$^2$ and the duration 30 min. Three porous substrates bonded. Total weight gain after the bonding was 13%.

Figure 12D:
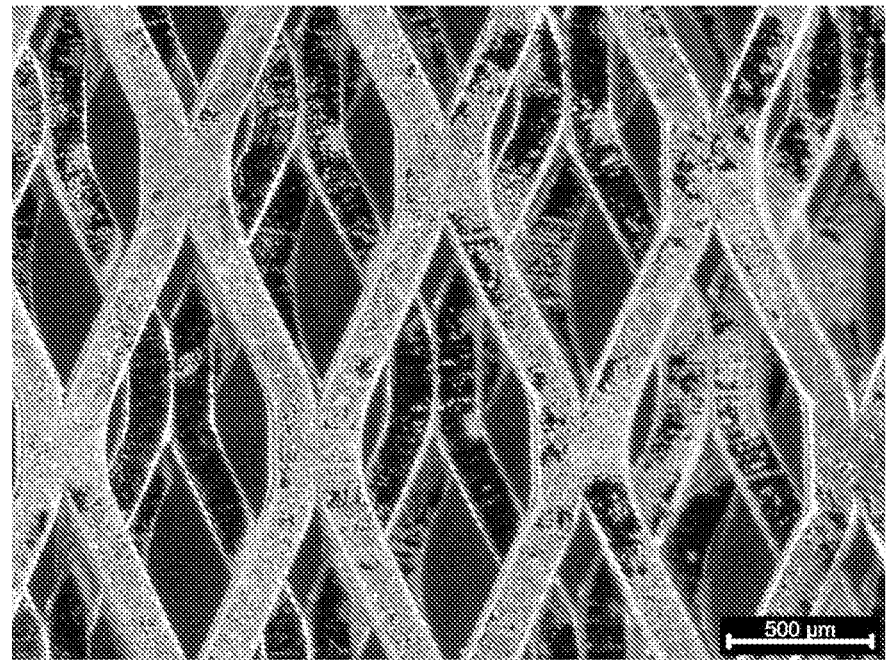
FIG. 12D is a photomicrograph of porous copper films subjected to LCW using a copper electrolyte solution according to an embodiment of the invention.

FIG. 12D is a photomicrograph depicting localized LCW of copper with copper electrolyte. In this experiment, non-conductive frames for were used for both inlet and outlet of a device as in FIG. 2 with inlet round apertures of 2 mm and 18% open area and outlet round apertures of 1 mm and 4.5% open area. The deposition current was 200 mA/cm$^2$ and the duration 30 min. Three porous substrates bonded. Total weight gain after the bonding was 11.6%.

Figure 12E:
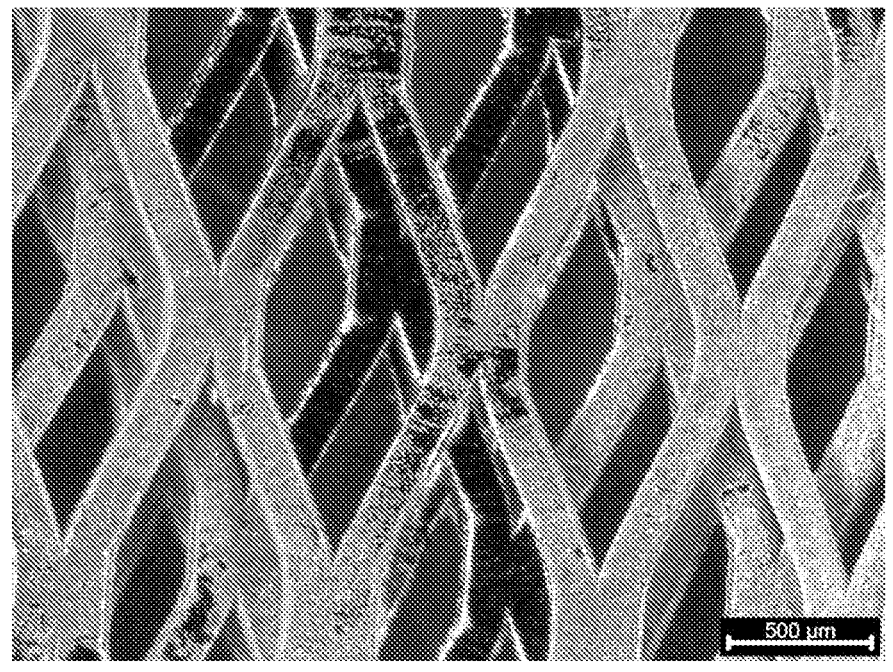
FIG. 12E is a photomicrograph of porous copper films subjected to LCW using a copper electrolyte solution according to an embodiment of the invention.

FIG. 12E is a photomicrograph depicting localized LCW of copper with copper electrolyte. In this experiment, non-conductive frames for were used for both inlet and outlet of a device as in FIG. 2 with inlet round apertures of 1 mm and 4.5% open area and outlet round apertures of 1 mm and 18% open area. The deposition current was 200 mA/cm$^2$ and the duration 30 min. Three porous substrates bonded. Total weight gain after the bonding was 14%.

Figure 12F:
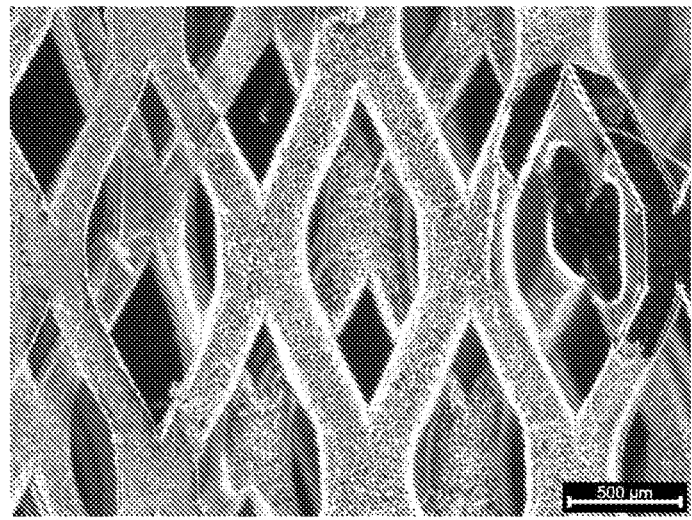
FIG. 12F is a photomicrograph of porous copper films subjected to LCW using a copper electrolyte solution according to an embodiment of the invention.

FIG. 12F is a photomicrograph depicting localized LCW of copper with copper electrolyte. In this experiment, non-conductive frames for were used for both inlet and outlet of a device as in FIG. 2 with round apertures of 3 mm (inlet and outlet) and plate porosity of 40% and outlet round apertures of 1 mm and 18% open area. The deposition current was 350 mA/cm$^2$ delivered in 500 millisecond pulses with 500 millisecond pauses (50% duty cycle) for 60 min. Three porous substrates bonded. Total weight gain after the bonding was 24%.

This example illustrates that LCW can be carried out using pulse deposition methods as well as constant current. The pulse parameters such as amplitude, duration, the rest step or even reversing of pulse current/voltage/power direction can be adjusted to produce various morphologies of metal deposits or to regulate amount of deposited metal. Variations of the pulse parameters are tailored for a wide variety of applications and the pulse parameters given above do not limit the scope of the claimed invention.

The invention claimed is:

1. A method of electrochemical deposition comprising:
   (a) folding a single porous conductive substrate layer to form two or more porous conductive substrate layers;
   (b) engaging said substrate layers between perforated non-conductive frames so that said substrate layers contact one another;
   (c) immersing said substrate layers in an electrolyte solution that contains dissolved metal ions; and
   (d) applying electric current and/or voltage and/or electric power to said electrolyte solution to effect metal or metal composite deposition from said ions in said electrolyte solution onto said substrate layers, thereby joining said two or more porous conductive substrate layers.

2. The method of claim 1, wherein said applying includes applying an electric current flowing from counter electrodes, through said porous conductive substrate layers between perforated non-conductive frames to working electrodes.

3. The method of claim 1, wherein said applying includes applying a constant voltage using a reference electrode.

4. The method of claim 1, wherein said applying includes applying a constant power.

5. The method of claim 1, comprising:
   Increasing a distance between said perforated non-conductive frames to facilitate insertion and/or removal of said two or more porous conductive substrate layers.

6. The method of claim 5, comprising:
   decreasing a distance between said perforated non-conductive frames so that the substrate layers contact one another.

7. The method of claim 1, comprising:
   pumping said electrolyte solution through said perforated non-conductive frames and said substrate layers during said applying.

* * * * *